June 12, 1956  E. R. CUNNINGHAM  2,750,137
MOTOR MOUNTING
Filed Sept. 18, 1953
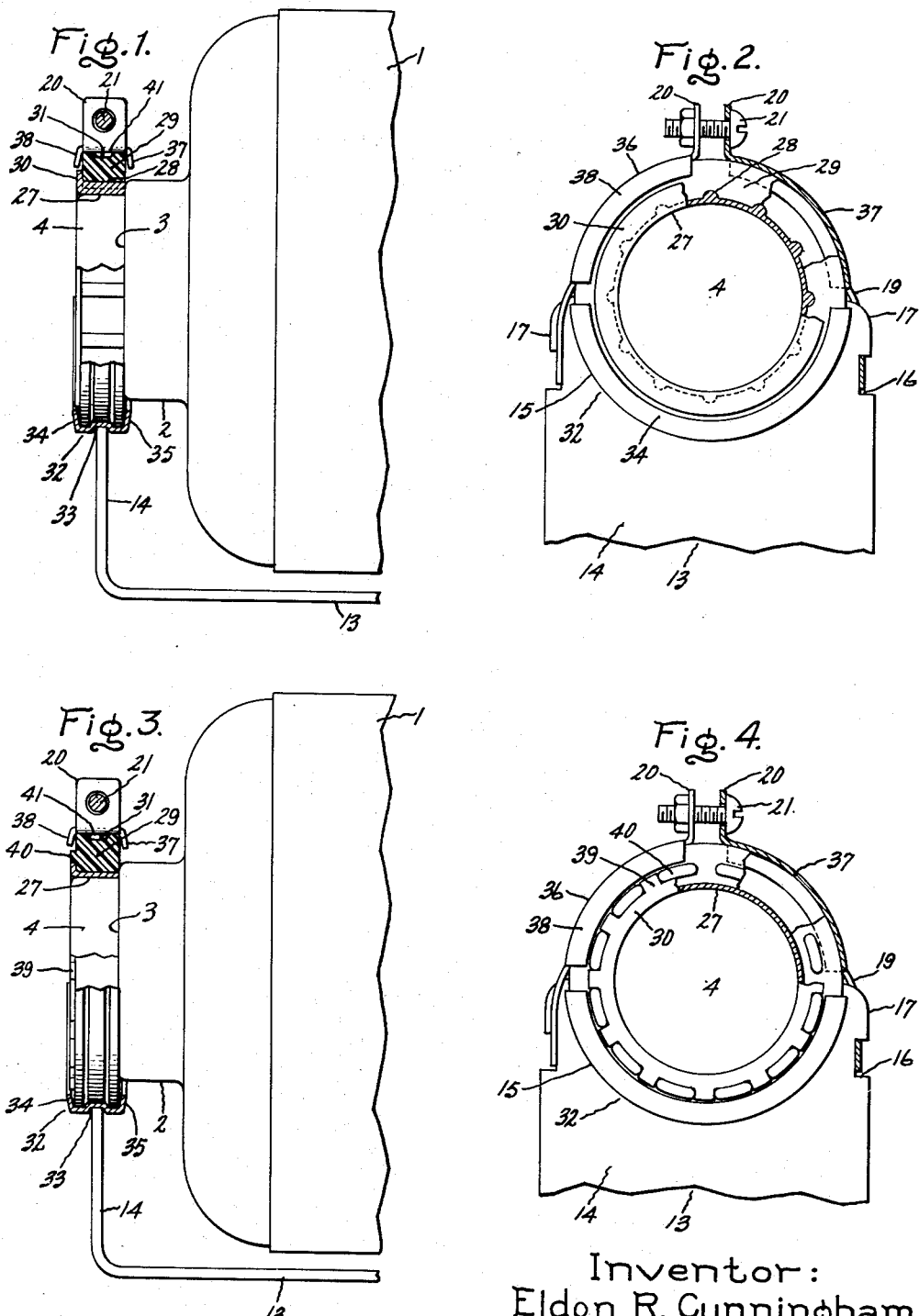
Inventor:
Eldon R. Cunningham,
by *Robert G. Iris*
His Attorney.

United States Patent Office 2,750,137
Patented June 12, 1956

2,750,137

MOTOR MOUNTING

Eldon R. Cunningham, Fort Wayne, Ind., assignor to General Electric Company, a corporation of New York Application September 18, 1953, Serial No. 380,990

3 Claims. (Cl. 248—26)

This invention relates to rotating apparatus, such as dynamoelectric machines, and more particularly to resilient mountings for such machines.

In the design of certain rotating machines, such as small motors, it is desirable to provide a mounting arrangement which will resiliently cushion the torsional vibration of the machine, but which will provide a relatively rigid support for the machine. Such a mounting is described in Patent 2,074,136, issued March 16, 1937, to Alfred F. Welch and assigned to the assignee of the present application. In accordance with the aforesaid Welch patent, the machine being supported is provided with a hub on which an annulus of a resilient material is arranged, the annulus being in turn supported by a cradle mounting or base member and attached thereto by suitable clamps or latches. This patent further discloses two types of resilient annului, the first having internal projections mating with cooperating slots in the hub and a split outer metallic band bonded to its outer periphery. The second type of resilient annulus or ring shown in the Welch patent is provided with an inner metallic band bonded to the inner periphery of the ring in addition to the split outer metallic band which is bonded to the outer periphery of the ring.

The construction of the Welch patent has been highly successful, however it has been found that the so-called double bonded mounting ring having both inner and outer bonded metallic bands is desirable since it provides sufficient force for maintaining a connection between the machine and the base whereas the single bonded ring having only the outer bonded metallic band tends to pull away from the hub under the influence of sudden end loads, particularly due to sudden shocks received during shipping. This has been the cause of motors falling out of the cradle during shipment. The double bonded ring however is considerably more expensive than the single bonded ring and it is therefore desirable to provide a resilient mounting arrangement of the type shown in the Welch patent incorporating a resilient mounting ring comparable in price to the single bonded ring of Welch and which will yet provide the requisite force for maintaining the connection between the machine and the base.

It is therefore an object of this invention to provide an improved resilient mounting for rotating machines incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a resiliently mounted rotating machine whose casing has a hub with a shoulder formed thereon and spaced from the end thereof so as to define an end portion. An annulus of resilient material is provided, and a supporting structure for mounting and holding the annulus stationary relative to the hub is provided. This supporting structure includes an annular sleeve member which is positioned on the hub end portion between the hub and the annulus with one edge engaging the shoulder and with a radially outwardly extending flange formed so as to engage the annulus on its edge which is remote from the shoulder. The sleeve and the annulus have cooperating means to prevent rotation of the annulus relative to the sleeve member. A substantially semicircular band is arranged around the lower portion of the annulus with flanges formed on both sides extending radially inwardly along the sides of the annulus so as to engage it. A supporting member engages the band, and means for securing the band to the supporting member are provided and include a two part clamping strap arranged around the remaining portion of the annulus. Each part of the strap is secured adjacent one end to the supporting member, and each strap has flanges formed on both edges thereof extending radially inwardly along the sides of the annulus and engaging the same. This construction precludes axial movement of the annulus by the engagement of the respective flanges on the annulus.

Fig. 1 is a side elevational view, partly in section, showing a portion of a small dynamoelectric machine provided with the improved resilient mounting of this invention;

Fig. 2 is a fragmentary end view, partly in section, further illustrating the construction of Fig. 1;

Fig. 3 is a side elevational view, partly in section, illustrating a portion of a small dynamoelectric machine provided with a modified form of this invention; and Fig. 4 is a fragmentary end view, partly in section, further illustrating the mounting of Fig. 3.

Referring now to Fig. 1, there is shown a dynamoelectric machine, generally identified as 1 having a hub portion 2 formed thereon. Hub portion 2 is provided with a shoulder 3 defining an end portion 4 having a slightly smaller diameter than the inner portion of hub 2. End portion 4 or hub 2 has its outer periphery smooth and a sleeve member 27 is arranged thereover with a tight fit. Sleeve member 27 has a plurality of spaced-apart axially extending projections 28 formed in its outer periphery and resilient annular ring 29 is arranged thereover. Ring 29 is provided with spaced-apart internal slots cooperating and mating with projections 28 on sleeve member 27. Sleeve member 27 has an outer annular flange 30 engaging the outer side of ring 29 thereby retaining it on hub 2. Ring 29 has an annular groove 31 formed in its outer periphery and a semicircular metal band 32 is arranged around the bottom portion thereof. Band 32 has an indentation 33 formed therein engaging groove 31 in ring 29. Band 32 is also provided with inwardly extending flanges 34 and 35 formed on its edges and extending on either side of ring 29.

A base or cradle member 13 is provided having an upright end portion 14 with an arcuate end 15 seated in indentation 33 of band 32, thereby supporting machine 1. In order to secure the machine and the resilient mounting to base 13, a pair of notches 16 are formed in the edges of portion 14 of base thereby defining projections 17.

A pair of clamps 36 and 37 have flanges 38 formed on either edge extending inwardly on either side of ring 29 and are provided with slots 19 engaging projection 17 portion 14 and mounting member 13. Clamps 36 and 37 are provided with outwardly extending portions 20 which are engaged by screw 21 thereby tightly to secure machine 1 to the base 13. Clamps 36 and 37 have an indentation 41 formed therein seated in groove 31 in ring 29.

It will be readily seen that the construction of the Figs. 1 and 2 provides an arrangement in which the combination of the sleeve member 27 with its flange 30 and the clamps 36 and 37 and band 32 with their flanges maintains the ring 29 on the hub 2 without requiring a double bonded ring.

Referring now to Figs. 3 and 4 in which like elements are again indicated by like reference numerals it will be seen that sleeve 27, instead of being provided with the projections 28 on its outer periphery as shown in Figs. 1 and 2, is now provided with a plurality of equally spaced apart projections 39 formed on its flanges 30. Projections 39 on sleeve 27 extend between raised portions 40 formed on the side of ring 29 thereby preventing tangential movement of the ring 29 on the hub 2.

It will be seen that the projections of 39 of retainer member 30 of Figs. 3 and 4 may be engaged in recesses in the ring 29 rather than between the projections 40 in order to prevent relative rotation of the ring and retainer member.

It will now be readily apparent that this invention provides an improved resilient mounting for rotating machines incorporating the desirable features of an unbonded mounting ring and yet retaining the desired force for resisting the tendency for the ring to be pulled away from the hub due to sudden shocks.

While I have shown the described particular embodiments of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. In a resiliently mounted rotating machine comprising a casing having a hub, said hub having a shoulder formed thereon spaced from the end thereof defining an end portion, an annulus of resilient material, supporting structure for mounting and holding said annulus stationary relative to said hub comprising an annular sleeve member positioned on said hub end portion between said hub and said annulus with one edge engaging said shoulder, and having a radially outwardly extending flange formed on the edge thereof remote from said shoulder and engaging said annulus, said sleeve and said annulus having cooperating means to prevent rotation of said annulus relative to said sleeve member, a substantially semi-circular band arranged around the lower portion of said annulus and having flanges formed on both sides thereof extending radially inwardly along the sides of and engaging said annulus, a supporting member engaging said band, and means securing said band to said supporting member including a two-part clamping strap arranged around the remaining portion of said annulus, each part of said strap being secured adjacent one end to said supporting member, said clamping strap having flanges formed on both edges thereof, said last named flanges extending radially inwardly along the sides of and engaging said annulus, whereby axial movement of said annulus is prevented by the engagement of the respective flanges on said annulus.

2. The combination of claim 1 wherein the cooperating means comprises a plurality of spaced-apart projections formed on the outer surface of said sleeve member, and a plurality of indentations respectively accommodating said sleeve member projections on the inner surface of said annulus.

3. The combination of claim 1 wherein the cooperating means comprises a plurality of spaced-apart outwardly extending projections formed on the outer periphery of the sleeve flange member and a plurality of raised portions formed on the outer face of said annulus respectively accommodating said sleeve flange projections.

References Cited in the file of this patent

UNITED STATES PATENTS

| | | |
|---|---|---|
| 1,678,438 | Leland | July 24, 1928 |
| 2,004,532 | Mapes | June 11, 1935 |
| 2,074,136 | Welch | Mar. 16, 1937 |
| 2,096,139 | Spahr | Oct. 19, 1937 |
| 2,209,477 | Reibel | July 30, 1940 |
| 2,212,401 | Morrill et al. | Aug. 20, 1940 |